United States Patent

Magyar

[11] 4,065,072
[45] Dec. 27, 1977

[54] SEAT BELT RETRACTOR WITH WINDING PREVENTION MECHANISM

[75] Inventor: Joseph J. Magyar, Rochester, Mich.

[73] Assignee: General Motors Corporation, Detroit, Mich.

[21] Appl. No.: 710,250

[22] Filed: July 30, 1976

[51] Int. Cl.[2] .................... A62B 35/00; B65H 75/48
[52] U.S. Cl. .................................. 242/107.7; 280/747
[58] Field of Search .......... 242/107.6, 107.7, 107.4 R, 242/107.4 E; 280/744–747; 297/388; 180/82 C

[56] References Cited

U.S. PATENT DOCUMENTS

| | | | |
|---|---|---|---|
| 3,491,966 | 1/1970 | Curran et al. | 242/107.6 X |
| 3,682,412 | 8/1972 | Kuszynski | 242/107.6 X |
| 3,700,184 | 10/1972 | Francis | 242/107.6 X |
| 3,834,646 | 9/1974 | Heath | 242/107.7 |
| 3,869,098 | 3/1975 | Sprecher | 242/107.6 X |
| 3,973,786 | 8/1976 | Rogers | 280/747 |

Primary Examiner—Stanley N. Gilreath
Assistant Examiner—John M. Jillions
Attorney, Agent, or Firm—Charles E. Leahy

[57] ABSTRACT

A seat belt retractor has a belt reel with a restraint belt attached thereto and biased in the belt winding direction of rotation by a windup spring. A detent mechanism comprised of a pawl and ratchet normally permits belt winding reel rotation by the windup spring and is movable to a detenting position wherein the pawl engages the ratchet to hold the belt in a nontensioned restraining position about the occupant. A control mechanism comprised of a control disc and a blocking disc operate the pawl between the detenting and undetenting positions in response to rotation of the discs through less than one revolution between one limit at which rotation in the unwinding direction is stopped and another limit at which rotation in the winding direction is stopped. The pawl coacts with the discs to define the limits of rotation. A friction clutch acts between the discs and the reel to rotate the discs as a unit with the reel and permit continued rotation of the reel after the discs are stopped at their respective limits of rotation by the pawl. A selected operator actuated means such as the vehicle door is operably connected with the pawl to move the pawl out of its rotation limiting coaction with the blocking disc and control disc so that the discs are freed for unitary rotation with the belt reel, thereby terminating the relative rotation between the discs and the reel so that the windup spring need not overcome the frictional impediment normally exerted on the reel by slippage of the friction clutch.

3 Claims, 13 Drawing Figures

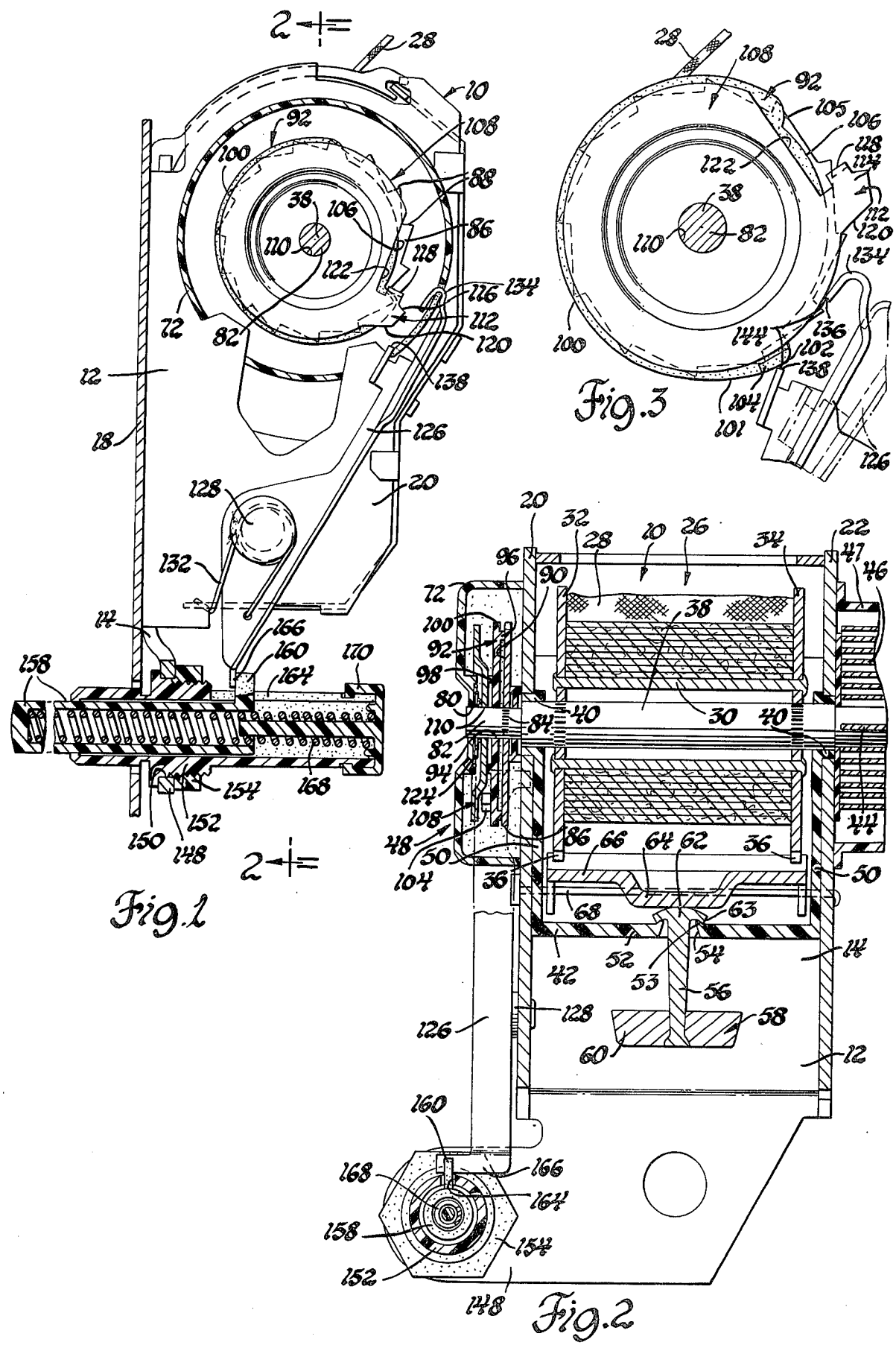

SEAT BELT RETRACTOR WITH WINDING PREVENTION MECHANISM

BACKGROUND OF THE INVENTION

The invention relates generally to a seat belt retractor for a vehicle occupant restraint system and more particularly to a winding prevention mechanism for a belt retractor wherein the torsional capacity of the belt windup spring is minimized by an operator actuatable device for selectively terminating the frictional impediment which the winding prevention mechanism normally exerts in opposition to the belt winding effort exerted by the windup spring.

Occupant restraint systems for a motor vehicle commonly employ a shoulder belt which extends over the shoulder and across the chest of the seated occupant. One type of well known seat belt system is a three-point belt system comprising a single length of belt having its lower end mounted to the vehicle floor outboard the occupant seating position and its upper end attached to the vehicle body by an inertia responsive seat belt retractor. A latch plate assembly is mounted on the belt intermediate the ends and is engageable with a buckle mounted inboard of the occupant seating position to divide the belt into a shoulder belt portion and a lap belt portion. The seat belt retractor utilized in such a seat belt system commonly utilizes a relatively strong windup spring which rotates a reel to wind a substantial portion of the shoulder belt onto the reel and suspend the latch plate assembly and lap belt portion in a generally vertical stored position adjacent the wall of the passenger compartment. It is known that three-point belt system are effective for restraint of the occupant even though the shoulder belt portion is in a somewhat slackened relation with respect to the chest of the occupant.

It has been discovered that utilization of a relatively strong windup spring in the retractor results in a level of shoulder belt load across the chest which is annoying to some seat occupants. It is therefore desirable to provide means for relieving the tension of the windup spring on the belt so as to relieve the belt tension across the chest of the occupant.

It is known to provide a restraint belt retractor having a winding prevention mechanism which selectively relieves the tension on the belt response to a predetermined sequence of belt movement by the restrained occupant. U.S. Pat. No. 3,869,098 by Raymond G. Sprecher, issued Mar. 4, 1975, and assigned to the assignee of this invention, discloses a belt retractor of the aforedescribed type wherein a control disc and a blocking disc are frictionally clutched to the reel for rotation therewith and cooperate to control movement of a winding prevention pawl into detenting engagement with ratchet teeth carried by the reel. Rotation limiting devices acting between the discs and the retractor housing define limits at which rotation of the discs are stopped whereupon the friction clutch acting between the discs and the reel begins to slip to permit continued rotation of the reel while the discs remain stationary.

U.S. Pat. No. 3,973,786, by Lloyd W. Rogers, Jr., filed Mar. 28, 1975 and assigned to the assignee of this invention, discloses a seat belt retractor wherein a winding prevention pawl is moved to an undetenting position in response to opening movement of the vehicle door so that the winding prevention mechanism is automatically cancelled by disengaging the pawl from the ratchet teeth to wind the belt whenever the door is moved from closed to open position. This assures retraction of the belt system to stored position to facilitate ease of occupant ingress and egress independent of the occupant's performance of the sequence of belt movement for cancelling the winding prevention mechanism.

A disadvantage of the prior known winding prevention mechanisms is that the control mechanism for operating the winding prevention pawl imparts a frictional force to the reel which opposes belt winding reel rotation and windup of the belt by the windup spring. Accordingly, the torsional capacity of the windup spring must be sufficient to overcome the frictional impedance imparted to the reel by the control mechanism. For example, in the winding prevention mechanism of the aforedescribed Sprecher and Rogers patents, the windup spring must have a sufficient torsional capacity to overcome the frictional impedance of the friction clutch which acts between the discs and the reel.

BRIEF SUMMARY OF THE INVENTION

The present invention provides a seat belt retractor wherein the frictional impedance exerted on the belt reel by the winding prevention mechanism is terminated in response to selective operator actuation, thereby permitting a reduction in the torsional capacity of the belt winding spring by an amount which would otherwise by necessary to wind the spring against the frictional impedance.

According to the preferred embodiment of the invention, a belt reel has the restraint belt attached thereto and is biased in the belt winding direction of rotation by a windup spring which tensions the belt in a restraining position about the occupant and winds the belt to a stored position on the reel. A detent mechanism comprised of a pawl and ratchet normally permits belt winding reel rotation by the windup spring and is movable to a detenting position wherein the pawl engages the ratchet to hold the belt in a nontensioned restraining position about the occupant. A control mechanism comprised of a control disc and a blocking disc operate the pawl between the detenting and undetenting positions in response to rotation of the discs through less than one revolution between one limit at which rotation in the unwinding direction is stopped and another limit at which rotation in the winding direction is stopped. A friction clutch acts between the discs and the reel to rotate the discs as a unit with the belt reel in both directions and permit continued rotation of the belt reel after the discs are stopped at their respective limits of rotation. During this continued rotation of the reel, the slippage of the frictional clutch exerts a frictional impedance to rotation of the reel which must be overcome by the windup spring during belt winding rotation of the reel. The pawl has surfaces thereon which are cooperable to define the limits of rotation of the control disc and the blocking disc. An operator actuated means such as the vehicle door is operably connected with the pawl to move the pawl out of its rotation limiting coaction with the blocking disc and control disc so that the discs are freed for unitary rotation with the belt reel, thereby terminating the relative rotation between the discs and the reel so that the windup spring need not overcome the frictional impediment normally exerted on the reel by slippage of the frictional clutch.

An object, feature and advantage of the invention is the provision of a winding prevention mechanism wherein a selective operator actuation terminates a normal operating coaction between a winding prevention pawl and both a ratchet plate and a control means which are carried by the reel.

Another object, feature and advantage of the invention is a belt retractor wherein selective operator actuation is effective to terminate a frictional impedance exerted on the reel by a winding prevention mechanism.

It is a further object, feature and advantage of the invention to provide a winding prevention pawl which defines the limits of rotation of pawl operating discs so that the discs may rotate freely with the reel when the pawl is moved away from rotation limiting coaction with the discs.

A still further object, feature and advantage of the invention is the provision of a belt retractor wherein the necessary winding effort of the belt winding spring is minimized by utilization of mechanism responsive to an operator actuation such as opening movement of the door to terminate a frictional impediment which is otherwise imposed on the reel by a winding prevention mechanism.

BRIEF DESCRIPTION OF THE DRAWINGS

These and other objects, features and advantages of the invention will become apparent upon consideration of the specification and the appended drawings in which:

FIG. 1 is a partially broken away side elevation view of a vehicle occupant restraint belt retractor with the winding prevention mechanism of the invention shown in a position wherein opening movement of the vehicle door terminates coaction between the pawl and the control mechanism of the winding prevention mechanism;

FIG. 2 is a sectional view of a retractor taken in the direction of arrows 2—2 of FIG. 1;

FIG. 3 is an enlarged partial view of the winding prevention mechanism wherein the phantom-line indicated pawl is in the door open position away from coaction with the control mechanism of the winding prevention mechanism and the solid-line indicated pawl shows one of the many random positions of the pawl relative the control disc and blocking disc which may occur when the pawl is restored to its coacting relation with the control mechanism upon closure of the vehicle door;

DETAILED DESCRIPTION OF THE PREFERRED EMBODIMENT

Figure 4:
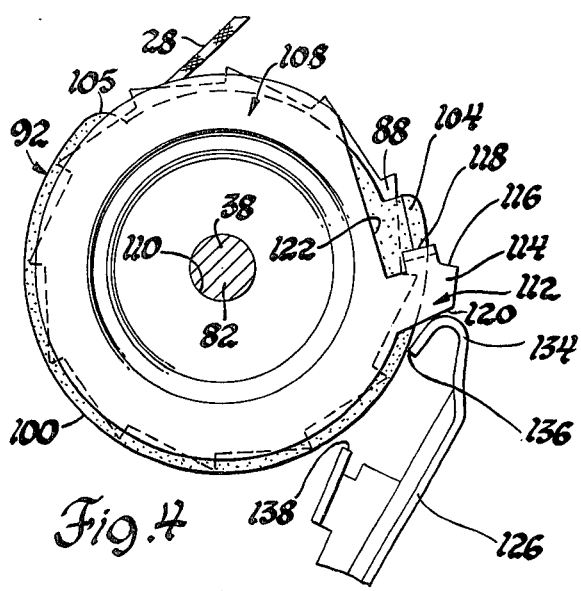
FIG. 4 is a view similar to FIG. 3 but showing the reel being rotated somewhat in the unwinding direction to a position wherein the blocking disc lifts the pawl outwardly.

Referring to FIGS. 1 and 2 of the drawings, a vehicle occupant restraint belt retractor is generally indicated by 10 and includes a metal housing 12. A base wall 14 of the housing 12 overlies and is conventionally attached to a vehicle body support member 18. The retractor 10 is particularly suited for use as a shoulder belt retractor and the support member 18 is preferably a door pillar of the vehicle body. The retractor housing 12 also has spaced apart parallel side walls 20 and 22 which are formed integrally with the base wall 14. A belt reel, designated generally at 26, is rotatably mounted between the side walls 20 and 22 of the retractor housing 12 and receives a belt 28 that extends upwardly and outwardly for positioning over the shoulder and across the chest of a vehicle occupant to provide a restraining function in a manner to be described hereinafter.

The belt reel 26 of retractor 10 includes an elongated drum 30 on which the belt 28 is wound and which extends between ratchet plates 32 and 34 on the opposite sides of the belt 28. The ratchet plates 32 and 34 are suitably fixed to the opposite ends of the belt drum 30 and have ratchet teeth 36 that face in the belt unwinding direction of reel rotation. The belt unwinding direction is clockwise as viewed in FIG. 1. An elongated shaft 38 is received by the belt drum 30 and suitably fixed to the ratchet plates 32 and 34 such as by splining. The ends of shaft 38 are rotatably supported on the housing side walls 20 and 22 by bushing portions 40 of a pendulum support member 42. The FIG. 2 right-hand end of shaft 38 extends outwardly through the adjacent housing wall 22 and has a slot which receives the inner end 44 of a windup spring 46. Windup spring 46 is a spiral or clock spring, the outer end of which is suitably fixed to the adjacent housing side wall 22 or to a spring cover 47 so that the belt reel 26 is normally biased in a belt winding direction to wind the belt 28 to a stored position on the belt reel 26. As the belt is unwound from the belt reel 26 the windup spring 46 is wound tighter and tighter to store energy for subsequent rewinding of the belt on the belt reel 26. As belt winding progresses the windup spring 46 becomes unwould and provides a progressively lessening effort on the reel to effect windup of the belt. The left-hand end of shaft 38 extends outwardly through the adjacent housing side wall 20 and is received by a winding prevention mechanism generally designated by 48.

Referring to FIG. 2, the pendulum support member 42 includes depending legs 50 that extend downwardly from the bushing portions 40 encircling the ends of shaft 38. The lower ends of these legs 50 are connected by a base 52 which is oriented in a horizontal plane. An aperture 54 in the base 52 is surrounded by an upwardly extending lip 53. A pendulum 58 has a stem 56 which extends through the aperture 54 and mushrooms outwardly above the base 52 into a control portion 62. A weight 60 is supported on the lower end of stem 56. The control portion 62 has a downwardly extending peripheral lip 63 which cooperates with lip 53 of support member 42 to support pendulum 58. The upper side of pendulum control portion 62 is engaged by a downwardly stamped control portion 64 on a locking member 66 of the retractor. The locking member 66 is pivotally supported by a pin 68 which extends between the housing side walls 20 and 22. The pendulum 58 swings from its vertically depending orientation of FIG. 2 to an inclined position in response to abrupt vehicle acceleration or deceleration. This swinging of the pendulum causes the pendulum control portion 62 to pivot the locking member 66 upwardly. The locking member 66 has locking portions, not shown, which move upwardly into engagement with the ratchet teeth 36 on the belt reel 26 to terminate belt unwinding reel rotation. When the vehicle acceleration or deceleration ends, gravity returns the pendulum 58 to its vertical position which then allows pivoting of the locking member 66 downwardly out of engagement with the reel ratchet teeth 36 so that belt unwinding is permitted. Since the locking member 66 is the only restraint on unwinding reel rotation, the occupant can normally unwind the belt by leaning forward in the seat or pulling on the belt 28.

The extension and retraction of belt 28 and simultaneous rotation of the belt reel 26 controls the winding prevention mechanism 48 to selectively prevent belt winding by the bias of windup spring 46. The winding prevention mechanism 48 includes a cover 72 that is fixedly mounted on the adjacent housing side wall 20 of retractor housing 12. The outer wall of cover 72 defines a circular bore 80 which rotatably receives a reduced diameter end portion 82 of reel shaft 38. This end portion 82 of the shaft 38 has splines 84 which attach a ratchet plate 86 to the shaft 38 for rotation with belt reel 26. As seen in FIG. 1, the ratchet plate 86 is generally circular and has ratchet teeth 88 which face in the counterclockwise belt winding direction of reel rotation; the opposite direction of the teeth 36 on the ratchet plates 32 and 34. The side of ratchet plate 86 that faces to the left in FIG. 2 provides a friction surface 90.

Figure 11:
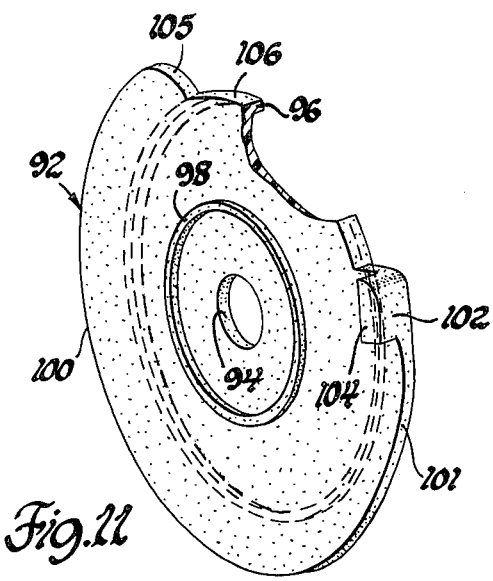
FIG. 11 is a perspective view showing the control disc.
Figure 12:
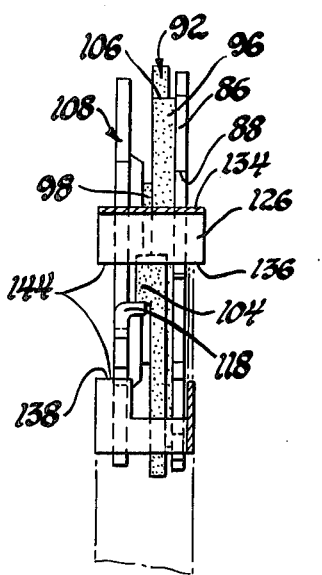
FIG. 12 is a sectional view taken in the direction of arrows 12—12 of FIG. 5.

A control disc of the winding prevention mechanism is best seen in FIGS. 2 and 11 and is generally indicated by 92. The control disc 92 has a cetral aperture 94 which rotatably receives the reduced diameter end portion 82 of the reel shaft 38 as seen in FIG. 2. The control disc 92 is juxtaposed with the ratchet plate 86 and has a peripheral annular rib 96 which frictionally engages the friction surface 90 of the ratchet plate 86. A similar annular rib 98 is provided on the opposite side of the control disc 92 from the annular rib 96 and has a smaller diameter than the rib 96. A control surface 100 of the control disc 92 extends circumferentially on the outer peripheral edge of the disc for somewhat less than 270°. One end of the control surface 100 has a radially raised surface 102 which is connected to the control surface by a gradually rising surface portion 101. A projection 104 projects axially from the raised surface 102 of control disc 92 and extends toward the cover 72 of the winding prevention mechanism as seen in FIG. 2. The other end 105 of control surface 100 is rounded, as seen in FIG. 12, and cooperates with the projection 104 in defining a notch 106 which extends circumferentially over approximately 90° of the peripheral edge of the control disc 92. As best seen in FIGS. 1 and 3, the control surface 100 of the control disc 92 is located radially outwardly of the ratchet teeth 88 on ratchet plate 86 so that the control disc overlies the ratchet teeth 88. The notch 106 has a radius less than the radius of the control surface 100 and exposes several of the ratchet teeth 88.

Referring to FIGS. 1 and 2, the winding prevention mechanism 48 also includes a blocking disc, generally designated at 108, having a central aperture 110 that rotatably receives the reduced diameter end portion 82 of the reel shaft 38 so that the blocking disc 108 may rotate with respect to the shaft 38. As seen in FIGS. 1 and 3, the blocking disc 108 has a diameter less than the diameter of control surface 100 of control disc 92 except for an outwardly projecting blocking portion indicated generally by 112. The blocking porton 112 includes a radially outwardly projecting tip 114 which defines a notch 116 facing in the counterclockwise belt winding direction and an inclined surface 120 facing in the other direction. A projection 118 projects axially from the blocking portion 112 and toward this control disc 92. The axial projection 104 of the control disc 92 is engageable with the projection 118 on the blocking disc 108 to limit rotation of the control disc 92 relative the blocking disc 108 in both the belt winding and belt unwinding directions. A window 122 in the periphery of the blocking disc 108 extends in the couterclockwise direction from the blocking portion 112 to expose the ratchet teeth 88.

A spiral compression spring 124 is received on the reduced diameter end portion 82 of the reel shaft 38 and engages the cover 72 of the winding prevention mechanism 48 as well as the blocking disc 108. Spring 124 biases the blocking disc 108 to the right as viewed in FIG. 2 so as to frictionally clutch the blocking disc 108 against the annular rib 98 of the control disc 92. The annular rib 96 of the control disc 92 is in turn frictionally clutched to the friction surface 90 on the ratchet plate 86. Thus, the control disc 92 and the blocking disc 108 are frictionally clutched to the ratchet plate 86 for rotation with the belt reel 26.

A pawl 126 of the winding prevention mechanism 48 is best seen in FIG. 1. The pawl is preferably a sheet metal stamping and has an aperture which receives a pivot shaft 128 mounted on the retractor housing side wall 20 to mount the pawl 126 for pivotal movement. A spring 132 encircles the pivot shaft 128 and has one end engaging the housing side wall 20 and the other end engaging the pawl 126. The spring 132 biases the pawl 126 in the counterclockwise direction as viewed in FIG. 1.

One end of the pawl 126 is reversely bent to provide a rounded tip 134 which terminates in a detent surface 136. As best seen in FIG. 12, the rounded tip 134 and detent surface 136 have a lateral extent which overlies the peripheries of the ratchet plate 86, control disc 92 and blocking disc 108. Pawl 126 also has a stop surface 138 which is spaced from and faces toward the detent surface 136. The lateral extent and positioning of the stop surface 138 is such as to overlie the periphery of the blocking disc 108. The space between the detent surface 136 and the stop surface 138 define an opening 144 in which the blocking portion 112 of the blocking disc 108 is selectively captured as will be described hereinafter.

Figure 5:
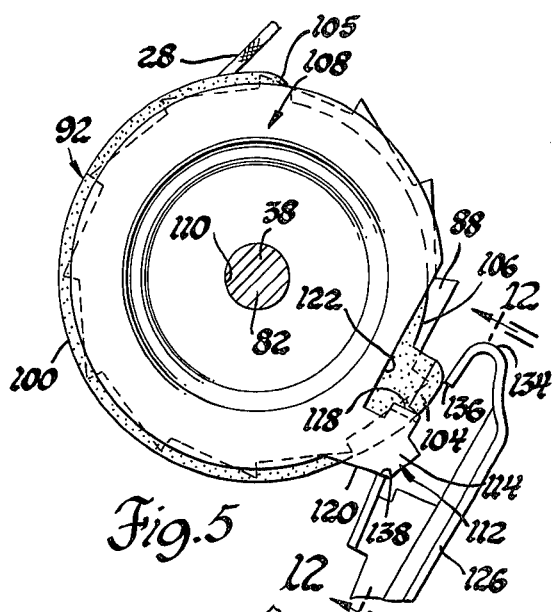
FIG. 5 is a view similar to FIG. 4 but with the reel in a further belt unwound condition wherein the blocking disc is captured in rotation limiting engagement by the pawl.
Figure 6:
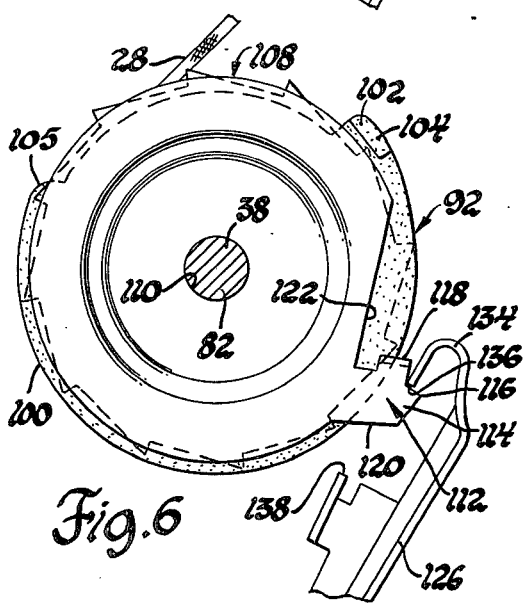
FIG. 6 is a view similar to FIG. 5 but showing the reel rotated in the belt winding direction wherein the blocking disc is stopped at its limit of rotation in the winding direction and holds the pawl captured in an undetenting position.
Figure 7:
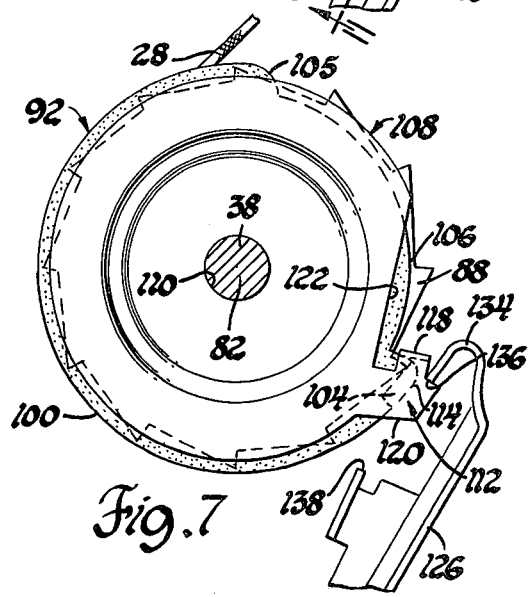
FIG. 7 is a view similar to FIG. 6 but showing the reel rotated further in the belt winding direction from FIG. 6 so that the control disc engages the blocking disc and both discs are stopped at their limit of rotation in the belt winding direction.
Figure 8:
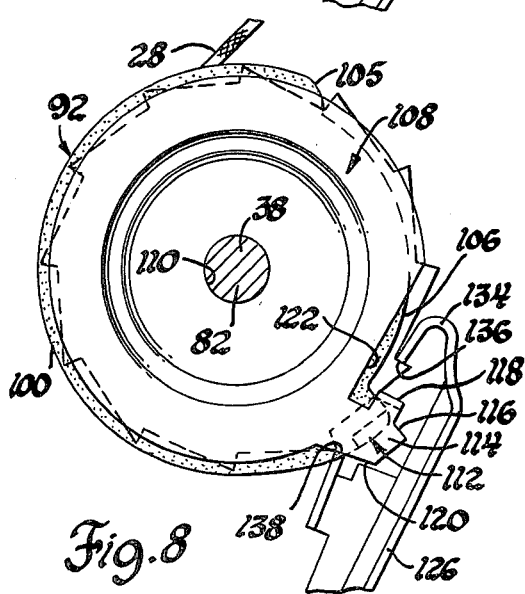
FIG. 8 is a view similar to FIG. 7 but showing the reel unwound slightly from the condition of FIG. 7 so that the pawl engages the ratchet teeth to prevent belt winding reel rotation and maintain slack in the belt.
Figure 9:
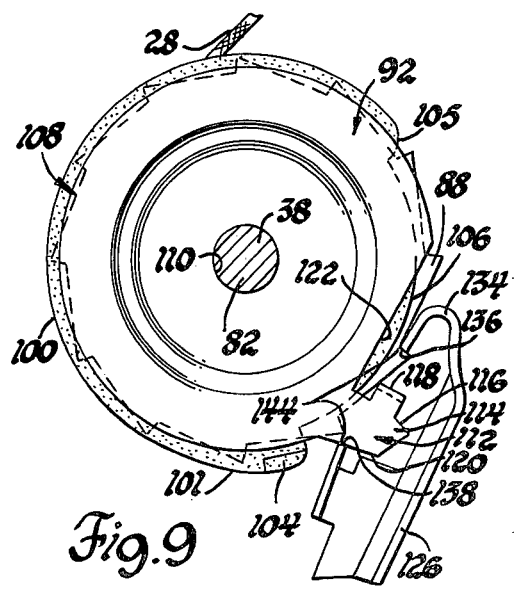
FIG. 9 is a view similar to FIG. 8 but showing the reel rotated somewhat in the belt unwinding direction so that the pawl ratchets over the nex ratchet tooth exposed by a notch in the control disc to add an additional increment of slack in the belt.

When the blocking portion 112 of the blocking disc 108 is captured in the opening 144 of the pawl 126, the blocking disc 108 is captured to define the limits of rotation of the blocking disc 108. FIGS. 5, 8 and 9 show the inclined surface 120 engaged with the stop surface 138 of the pawl 126 to limit rotation of the blocking disc 108 in the belt unwinding clockwise direction of rotation. FIGS. 6 and 7 show the detent surface 136 in engagement with the notch 116 of the projection 118 of the blocking portion 112 to limit rotation of the blocking disc 108 in the belt winding counterclockwise direction of rotation.

The other end of the pawl 126 is adapted for actuation by the vehicle door. A door actuated mechanism is mounted on an extension portion 148 of the housing base wall 14 and has an aperture 150. A tubular housing 152 is received in the aperture 150 and attached to the extension portion 148 by a nut 154. A plunger 158 is slidably received in the tubular housing 152 and has a laterally extending projection 160 which extends through a slot 164 in the tubular housing 152 and is engageable with an abutment portion 166 of the pawl 126. A coil compression spring 168 acts between the plunger 158 and a cap 170 mounted on the end of tubular housing 152 to urge the plunger 158 to an extended position as shown in FIG. 1 wherein the lateral projection 160 engages the abutment portion 166 of pawl 126 and pivots the pawl 126 clockwise against the bias of spring 132 to the position of FIG. 1 wherein the detent surface 136 and stop surface 138 of the pawl 126 are withdrawn from coaction with the discs 92 and 108 of the winding prevention mechanism 48.

The retractor 10 is mounted on the vehicle body such that the plunger 158 extends into the path of movement of the door and is engaged and forcibly moved to the retracted position upon closure of the vehicle door. The resulting rightward movement of the plunger 158 moves the lateral projection 160 rightwardly and releases the pawl 126 for counterclockwise movement by the bias of spring 132 to initiate coaction between the pawl 126 and the discs of the winding prevention mechanism as will be described hereinafter.

OPERATION

Referring to FIG. 1, it will be understood that with the vehicle door in open position to permit entry of the occupant into the vehicle, the plunger 158 is extended outwardly of the door opening by the coil compression spring 168. The lateral projection 160 of plunger 158 holds the pawl 126 in the position of FIG. 1 against the bias of the pawl spring 132.

When the pawl 126 is in the position of FIG. 1, there is no rotation limiting coaction between the pawl 126 and the blocking disc 108 so that the blocking disc 108 and the control disc 92 are permitted to rotate with the reel 26 in either the belt winding or belt unwinding directions of rotation.

Upon entry of the occupant into the vehicle and closing of the door, the plunger 158 is retracted thereby releasing pawl 126 for counterclockwise pivotal movement by the pawl spring 132 from the phantom-line indicated position of FIG. 3 to the solid-line indicated position of FIG. 3. It will be understood that the control disc 92 and the blocking disc 108 may be in any of a number of random positions relative one another and the pawl 126. FIG. 3 shows one such possible random positional relationship.

The occupant initiates deployment of the seat belt to its restraining position by unwinding of the belt 28 from the reel 46. As the belt 28 is unwound from the fully stored condition on the belt reel 26, the control disc 92 and the blocking disc 108 are frictionally carried with the belt reel 26 in the clockwise unwinding direction. Rotation of the blocking disc 108 in the clockwise unwinding direction of rotation is stopped when the inclined surface 120 of the blocking portion 112 is carried into engagement with the rounded tip 134 of the pawl 126, as seen in FIG. 4.

Clockwise unwinding rotation of the control disc 92 continues with the belt reel 26 and eventually reaches the position of FIG. 4 wherein the projection 104 of the control disc 92 engages the projection 118 of the blocking disc 108. Upon further belt unwinding rotation, the control disc 92 drives the blocking disc 108 so that both discs rotate in unison. The incline of the inclined surface 120 cams the pawl 126 outwardly against the bias of the pawl spring 132. Further rotation of the blocking disc 108 carries the projecting tip 114 of the blocking portion 112 under the rounded tip 134 and beyond the detent surface 136 whereupon the bias of the pawl spring 134 rotates the pawl 126 inwardly to the position of FIG. 5 wherein the projecting tip 114 is captured in opening 144 and becomes engaged against stop surface 138 to block further unwinding rotation of the blocking disc 108 and control disc 92. As seen in FIG. 5, the rounded tip 134 seats on the radially raised surface 102 to prevent further inward movement of the pawl 126.

The lateral projection 104 of control disc 92 remains in engagement with the projection 118 of blocking disc 108 so that both discs remain stationary in the position of FIG. 5 during further unwinding rotation of the reel. This unwinding rotation of the reel progresses until the belt is sufficiently unwound from the reel to permit buckling of the belt and consequent engagement of the shoulder belt in restraining position about the chest of the seated occupant.

Subsequent to buckling of the belt 28 about the occupant, the winding spring rotates the reel in the belt winding direction to pull the belt taut against the occupant. Referring to FIG. 6, it will be seen that this winding rotation of the reel carries the control disc 92 and blocking disc 108 in the counterclockwise belt winding direction of rotation. Rotation of the blocking disc 108 in the winding direction is limited by engagement of the detent surface 136 of the pawl 126 in the notch 116. During further belt winding rotation of the reel 26, the control disc 92 continues to rotate in the belt winding direction of rotation and upon one revolution of the reel reaches the position of FIG. 7 wherein the control disc projection 104 engages the blocking disc projection 118 to limit rotation of the control disc 92 in the belt winding direction of rotation. As seen in FIGS. 6 and 7, the detent portion 136 of the pawl 126 remains engaged in the notch 116 of the blocking portion 112 during this belt winding rotation of the reel.

After the winding spring rotates the reel in the belt winding direction to tension the belt about the chest of the occupant, the occupant may actuate the winding prevention mechanism by merely initiating unwinding of the belt by pulling on the belt or leaning forwardly against the belt. As seen in FIG. 8, unwinding rotation of the reel causes the blocking disc 108 to rotate in the clockwise unwinding direction of rotation thereby withdrawing the notch 116 from support of the rounded tip 134 of pawl 126 and allowing the pawl spring 132 to move the pawl 126 inwardly into engagement with the first exposed ratchet tooth 88 of the ratchet plate 86. This engagement of the detent surface 136 of pawl 126 with the ratchet teeth 88 blocks rotation of the reel 26 in the belt winding direction of rotation. Accordingly, the tension which is normally exerted on the belt by the effort of the winding spring is relieved. Thus, when the occupant leans back against the seat, an amount of slack will remain in the belt.

The occupant may further unwind the belt from the position of FIG. 9 and the pawl 126 will ratchet progressively over the ratchet teeth 88 exposed by the control disc notch 106 to introduce additional increments of slack into the belt 28. The control disc 92 rotates with the belt reel 26 during such further unwinding but the blocking disc 108 remains restrained from proceeding in the clockwise belt unwinding direction of rotation due to the engagement of the inclined surface 120 with the stop surface 138 of pawl 126.

Further unwinding of the belt adds increments of slack until the rounded clockwise end 105 of the control surface 100 engages the pawl 126 and moves the pawl 126 outwardly to an undetenting position away from engagement with the ratchet teeth 88 on the ratchet plate 86. Thus, the effective circumferential extent of the notch 106 exposing ratchet teech 88 defines a first range of unwinding reel rotation during which a one-way ratchet action provided by the pawl 126 and ratchet plate 86 may introduce progressive increments of slack into the belt 28.

Figure 10:
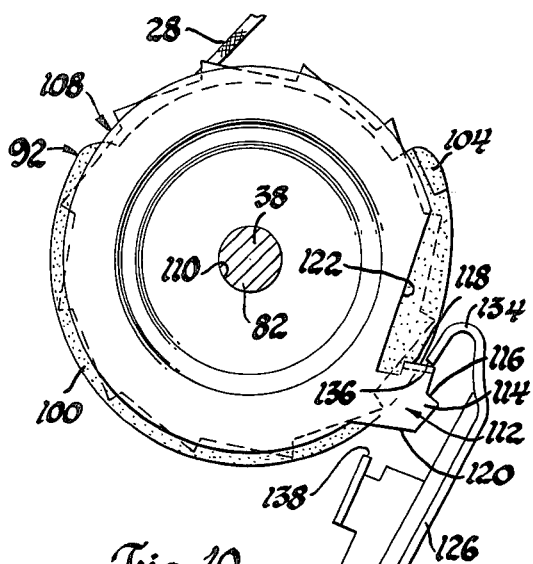
FIG. 10 is a view similar to FIG. 9 but showing the belt in a further unwound condition wherein the pawl is moved to an undetenting condition by a control surface on the control disc.

When belt unwinding has progressed to the extent shown in FIG. 10, pawl 126 will have been moved outwardly to the undetenting position by its engagement with the rounded end 105 of control surface 100. When the occupant relieves the unwinding effort applied to the belt 28, the windup spring 46 will rotate the belt reel 26 in the belt winding direction of rotation. This belt winding rotation of the reel continues until the control surface 100 is rotated from beneath the pawl 126 and the pawl 126 is again lowered to the detenting position in engagement of the last ratchet tooth 88 which is exposed adjacent the rounded end 105 of the control surface 100. Accordingly, the belt is restored to the tensionless condition wherein engagement between ratchet teeth 88 and the detent surface 136 of the pawl 126 blocks belt winding rotation by the windup spring. Thus, the seat occupant can lean forward to reach the vehicle controls or adjust his seating position and the belt will be unwound somewhat from the reel as the pawl 126 rides over the control surface 100. When the seat occupant leans back against the seat, the belt will be rewound by the winding spring until the control disc returns to a position where the notch 106 becomes aligned with the pawl to lower the pawl 126 back into engagement of the exposed ratchet tooth 88.

If belt unwinding progresses beyond the position of FIG. 10, the gradually rising portion 101 of control surface 100 will have lifted the pawl 126 outwardly to the elevation of the radially raised surface 102 on the control disc so that the pawl 126 is at the same elevation as the noth 116 of blocking disc 108. Subsequent winding rotation of the reel under bias of the winding spring 46 as the occupant leans back against the seat or relieves the pull on the belt will cause the blocking disc 108 to be moved in the winding direction so that the pawl 126 is received and held in its undetenting position by engagement in the notch 116. This cancels the memory of the winding prevention mechanism and restores the belt to the continuous tension of the windup spring 46 until the winding prevention feature is again reactivated.

It will be understood that the winding prevention mechanism can be again actuated by repeating te aforedescribed sequence of belt winding and unwinding rotation necessary to actuate the winding prevention mechanism.

During normal vehicle operation, the occupant will have the belt buckled and the winding prevention mechanism will be actuated. Accordingly, the winding prevention mechanism will be in the position shown in FIG. 8 or FIG. 9.

Cancellation of the winding prevention mechanism in the aforedescribed manner by unwinding the belt is not always convenient for the vehicle occupant. For example, the vehicle occupant may wish to simply unbuckle the belt, open the door, and alight from the vehicle without the necessity of unwinding the belt sufficiently to cancel the winding prevention mechanism so that the belt 28 is wound to the stored position.

Upon opening of the vehicle door the plunger 158 moves to its extended position of FIG. 1 thereby pivoting the pawl 126 outwardly to remove the detent surface 138 from engagement with the ratchet teeth 88, thereby permitting the windup spring to rotate the reel in the belt winding direction. This pivoting of the pawl 126 also terminates the capture of the blocking portion 112 of blocking disc 108 in the opening 144 of the pawl 126. Accordingly, the control disc 92 and blocking disc 108 rotate in unison with the reel and there is no slippage of the control disc 92 and blocking disc 108 relative the ratchet plate 86 during the belt winding reel rotation. This termination of the rotation limiting coaction eliminates the frictional impedance which the frictional clutching would normally impart to the reel in opposition to the effort of the belt windup spring. Accordingly, the torsional capacity of the windup spring can be reduced by an amount which would otherwise be necessary to wind the belt against the frictional impedance which is added by slippage of the frictional clutch.

It will be understood that movement of the pawl 126 to its furthest undetenting position of FIG. 1 can be effected by any convenient mode of operator actuation and is not limited to door actuation. For example, the pawl 126 could be operated by an electrical solenoid which would be electrically connected to a switch in the seat belt buckle or transmission selector.

Figure 13:
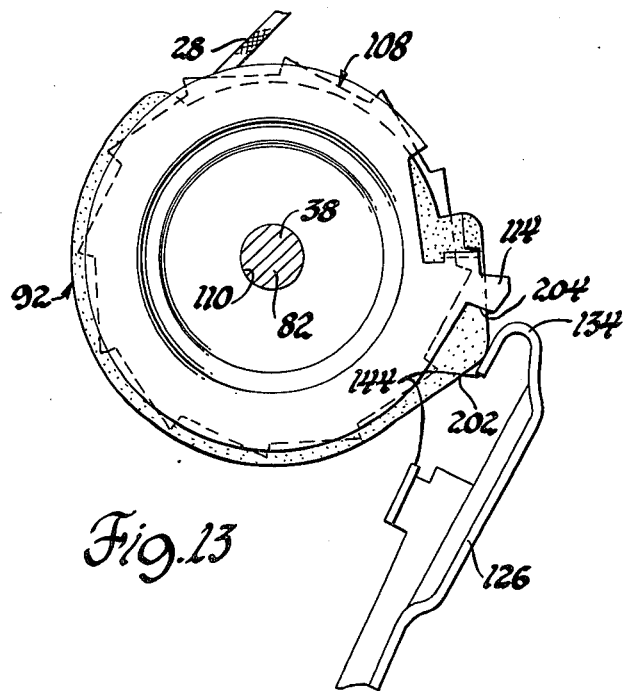
FIG. 13 is a view similar to FIG. 4 but showing an alternate construction of the control disc and blocking disc.

Referring to FIG. 13, there is shown an alternate configuration of the control disc and blocking disc. This alternate structure is generally similar and has like elements designated by like numerals. The alternative structure is different in that a lifting cam 202 is provided on the control disc 92 and the blocking disc 108 has a radially extending stop surface 204. As seen in FIG. 13, the lifing cam 202 of the control disc 92 moves the pawl outwardly away from engagement with the stop surface 204 to permit the blocking disc projecting tip 114 to move beneath the rounded tip 134 and be captured in the opening 144 of the pawl 126. Accordingly, it will be understood that the outward lifting action of the pawl 126 to initiate capture of the blocking disc 108 by the pawl 126 can be provided by a camming surface which is located on either the control disc 92 or the blocking disc 108.

The embodiments of the invention in which an exclusive property or privilege is claimed are defined as follows:

1. A vehicle occupant restraint belt retractor comprising:
    a rotatably mounted belt reel having a restraint belt attached thereto for winding and unwinding upon belt reel rotation;
    a windup spring biasing the belt reel in the belt winding direction, the windup spring providing a winding effort on the belt reel to tension the belt about the occupant when the belt is unwound from the belt reel to an occupant restraining position and provide a winding effort for rewinding the belt to the stored position on the belt reel;
    a detent mechanism operatively associated with the reel and normally permitting belt winding reel rotation by the windup spring and being operable to block belt winding reel rotation by the winding spring to hold the belt in a slackened restraining position about the occupant without exerting tension on the occupant;
    control means having a control surface coacting with the detent mechanism for controlling operation of the detent mechanism to the blocking position upon operator induced unwinding reel rotation subsequent to the belt being unwound and rewound to a taut restraining position about the occupant, the coaction of the detent mechanism with the control means imparting a frictional force to the reel which impedes belt winding reel rotation and windup of the belt by the effort of the winding spring;
    and means responsive to operator actuation to selectively terminate the coaction between the control means and detent mechanism during full windup of the belt to thereby terminate the frictional impediment to belt windup spring whereby the necessary winding effort of the winding spring is minimized.

2. A vehicle occupant restraint belt retractor comprising:
    a rotatably mounted belt reel having the restraint belt attached thereto for winding and unwinding upon belt reel rotation;
    a winding spring biasing the belt reel in the belt winding direction, the winding spring providing a winding effort on the belt reel to tension the belt about the occupant when the belt is unwound from the belt reel to an occupant restraining position and providing a progressively lessening winding effort on the belt reel during winding of the belt to stored position on the belt reel;
    means for selectively locking the belt reel against belt unwinding rotation;
    a detent member normally permitting belt winding reel rotation by the winding spring and being operable to block belt winding reel rotation by the winding spring to hold the belt in a slackened restraining position about the occupant without exerting tension on the occupant;
    control means having a control surface for controlling operation of the detent member to the blocking position upon rotation of the control means through less than one revolution between one limit at which rotation of the control means in the unwinding direction is stopped and another limit at which rotation of the control means in the winding direction is stopped;
    friction clutch means acting between the control means and the belt reel to rotate the control means as a unit with the belt reel in both directions and frictionally resist movement of the belt reel relative the control means when the control means is stopped at one of the limits of rotation;
    means on said detent member coacting with the control means for defining the limits of rotation of the control means;
    and means responsive to operator actuation to move the detent member out of rotation limiting coaction with the control means so that the control means is freed for unitary rotation with the belt reel whereby the frictional resistance of the friction clutch means is terminated so that the progressively lessening winding effort of the winding spring is sufficient to fully wind the belt on the reel to the stored position.

3. A vehicle occupant restraint belt retractor adapted to be mounted on a vehicle body and comprising:
    a housing;
    a belt reel rotatably mounted on the housing;
    a restraint belt attached to the reel and wound and unwound during reel rotation;
    a winding spring normally biasing the reel in the belt winding direction of rotation to tension the belt about the occupant and store the belt on the reel;
    means for selectively locking the belt reel against belt unwinding rotation;
    a ratchet wheel mounted on the belt reel for rotation therewith;
    a detent member movable between a detenting position engaging the ratchet wheel to block belt winding reel rotation by the winding spring and an undetenting position permitting belt winding reel rotation by the winding spring;
    disc means having a control surface engageable by the detent member for controlling movement of the detent member between detenting and undetenting positions upon rotation of the disc means through less than one revolution between one limit at which rotation of the disc means in the unwinding direction is stopped and another limit at which rotation of the disc means in the winding direction is stopped;
    friction clutch means acting between the disc means and the reel to rotate the disc means and the reel as a unit in both directions and frictionally resist movement of the reel relative the disc means when the disc means is stopped at one of the limits of rotation;
    means on the detent member coacting with the disc means for defining the limits of rotation of the disc means;
    and means responsive to operator actuation to move the detent member out of rotation limiting coaction with the disc means so that the disc means is freed for unitary rotation with the reel whereby the winding effort of the spring to wind the belt on the reel is not resisted by the friction of the friction clutch means.

* * * * *